United States Patent
Rösel et al.

(10) Patent No.: US 7,891,170 B2
(45) Date of Patent: Feb. 22, 2011

(54) METHOD AND APPARATUS FOR CONTROLLING AN INTERNAL COMBUSTION ENGINE

(75) Inventors: Gerd Rösel, Regensburg (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 1180 days.

(21) Appl. No.: 10/594,478

(22) PCT Filed: Feb. 4, 2005

(86) PCT No.: PCT/EP2005/050492

§ 371 (c)(1),
(2), (4) Date: Sep. 28, 2006

(87) PCT Pub. No.: WO2005/095777

PCT Pub. Date: Oct. 13, 2005

(65) Prior Publication Data

US 2007/0199304 A1    Aug. 30, 2007

(30) Foreign Application Priority Data

Mar. 31, 2004   (DE) .................. 10 2004 015 836

(51) Int. Cl.
    *F01N 3/00*   (2006.01)
(52) U.S. Cl. ............... 60/285; 60/276; 60/286; 60/299; 60/301
(58) Field of Classification Search .......... 60/274, 60/276, 285, 299, 273

See application file for complete search history.

(56) References Cited

U.S. PATENT DOCUMENTS

| | | | | |
|---|---|---|---|---|
| 5,359,852 | A | * | 11/1994 | Curran et al. .................. 60/274 |
| 5,544,481 | A | * | 8/1996 | Davey et al. .................. 60/274 |
| 5,901,552 | A | | 5/1999 | Schnaibel et al. |
| 6,253,542 | B1 | | 7/2001 | Omara et al. |
| 6,460,328 | B1 | * | 10/2002 | Hertzberg ..................... 60/285 |
| 6,477,458 | B1 | * | 11/2002 | Yasui et al. .................. 701/109 |
| 2004/0016229 | A1 | * | 1/2004 | Schnaibel et al. ............. 60/286 |
| 2004/0060550 | A1 | * | 4/2004 | Wu et al. ..................... 123/694 |

FOREIGN PATENT DOCUMENTS

| | | |
|---|---|---|
| DE | 43 22 341 A1 | 1/1994 |
| DE | 19606652 A1 | 8/1997 |
| DE | 100 28 470 A1 | 12/2000 |
| DE | 101 03 772 A1 | 9/2002 |

* cited by examiner

*Primary Examiner*—Binh Q Tran
*Assistant Examiner*—Jesse Bogue
(74) *Attorney, Agent, or Firm*—King & Spalding L.L.P.

(57) ABSTRACT

In order to control an internal combustion engine, a fuel mass that is to be supplied to the respective cylinder is determined according to a load variable. An additional fuel mass to be measured once is determined, when the measuring signal of an oxygen probe arranged downstream from a three-way catalytic converter is characteristic of at least one pre-determined residual oxygen part, according to the course of the measuring signal. A once reduced fuel mass is determined, when the measuring signal is characteristic of at least one pre-determined residual fuel part, according to the course of the measuring signal. A corrected fuel mass to be measured is determined according to the fuel mass to be supplied and optionally less the once reduced fuel mass or the fuel mass to be measured once. An actuating signal for controlling the injection valve is generated according to the corrected fuel mass to be supplied.

12 Claims, 3 Drawing Sheets

METHOD AND APPARATUS FOR CONTROLLING AN INTERNAL COMBUSTION ENGINE

CROSS REFERENCE TO RELATED APPLICATIONS

This application is the US National Stage of International Application No. PCT/EP2005/050492, filed Feb. 4, 2005 and claims the benefit thereof. The International Application claims the benefits of German Patent application No. 10 2004 015 836.3 filed Mar. 31, 2004. All of the applications are incorporated by reference herein in their entirety.

FIELD OF THE INVENTION

The invention relates to a method and apparatus for controlling an internal combustion engine with an intake tract and an exhaust tract incorporating a three-way catalytic converter, and with at least one cylinder which communicates with the intake tract depending on the position of a gas inlet valve and which communicates with the exhaust tract depending on the position of a gas outlet valve. There is additionally assigned to the at least one cylinder an injection valve which meters fuel in. An oxygen sensor is disposed downstream of the three-way catalytic converter in the exhaust tract.

BACKGROUND OF THE INVENTION

For internal combustion engines, increasingly stringent statutory provisions make it necessary on the one hand to reduce as much as possible the raw emissions caused by the combustion of the air/fuel mixture in the relevant cylinder. On the other hand, exhaust after-treatment systems are employed in internal combustion engines to convert the pollutant emissions produced during the combustion process of the air/fuel mixture in the cylinder into harmless substances. Specifically in the case of gasoline engines a three-way catalytic converter located in the engine's exhaust tract is used for this purpose. A high degree of efficiency in the conversion of the pollutant components carbon monoxide, hydrocarbons and nitrogen oxides is only guaranteed in a very narrow window between the stoichiometric air/fuel ratio and approximately 6 tenths of a percent in the direction of excess fuel. To compensate for actual variations in the air/fuel ratio in the relevant cylinder, three-way catalytic converters are coated with a layer of material which can briefly store oxygen and bind or release it as required. Such a coating is known as a wash-coat and consists e.g. of $Ce_2O_3$ (dicerium trioxide). By means of this wash-coat, fluctuations in the air/fuel mixture and the corresponding exhaust gas are thus compensated in the catalytic converter as long as the wash-coat has not yet bound its maximum quantity of oxygen or else no more oxygen is bound in the wash-coat. However, if these limits are exceeded, the efficiency of the three-way catalytic converter is markedly reduced, resulting in increased pollutant emissions from the internal combustion engine.

In the case of closed-loop lambda control incorporating an oxygen sensor disposed upstream of the three-way catalytic converter, it is known to use the measurement signal of an oxygen probe which is disposed downstream of the three-way catalytic converter and generates a binary measurement signal, to adjust a P- or I-component of the control parameters or a delay time of the lambda controller accordingly as a function of the measurement signal of the oxygen sensor downstream of the three-way catalytic converter. This is also known as trim control. However, it has been found that, despite this measure, particularly in the case of aging three-way catalytic converters, undesirably high pollutant emissions of the internal combustion engine may continue to occur.

A method for operating a three-way catalytic converter is known from DE 101 03 772 A1, wherein said catalytic converter includes an oxygen-storing component which has a minimum and maximum filling level for oxygen. The three-way catalytic converter is disposed in an exhaust gas line of an internal combustion engine. The air/fuel mixture supplied to the engine is regulated in such a way that the filling level of the oxygen-storing component in the catalytic converter is kept within a mean setpoint range between the minimum and maximum filling levels. Drifting of the filling level out of the setpoint range is checked in a test phase in such a way that the filling level is increased or lowered relative to the instantaneous initial value by short-term reduction in richness or enrichment of the air/fuel mixture supplied to the engine by a certain amount and immediately returning to the initial value by a short-term opposing change in the air/fuel mixture. In the event of a breakthrough of lean or rich exhaust gas through the catalytic converter during the test phase, the air/fuel mixture is briefly enriched or reduced in richness in the form of a correction step in order to correct the air/fuel mixture supplied to the engine.

U.S. Pat. No. 6,253,542 B1 discloses an air-fuel mixture control in an internal combustion engine which comprises a post-catalyst exhaust gas sensor. If the measurement signal of the post-catalyst exhaust gas sensor is outside a predefined acceptable range, a proportional parameter of the control is set as a function of the measurement signal.

Methods for adjusting an air/fuel ratio in an internal combustion engine are also known from DE 100 28 570 A1 and DE 43 22 341 A1, said methods in each case having oxygen sensors which are disposed downstream of a catalytic converter.

SUMMARY OF THE INVENTION

The object of the invention is to create a method and an apparatus for controlling an internal combustion engine which ensure low pollutant emissions over a long operating period of the internal combustion engine in a simple manner.

This object is achieved by the features of the independent claims. Advantageous embodiments of the invention are set forth in the dependent claims.

In respect of a first aspect, the invention is characterized by a method and a corresponding apparatus for controlling an internal combustion engine, wherein a mass of fuel to be supplied, which is to be fed to the relevant cylinder, is determined as a function of a load variable. The load variable can be, for example, a mass air flow into the relevant cylinder, but can equally be any other load variable such as a torque to be produced by the internal combustion engine which is determined e.g. as a function of the position of an accelerator pedal or some other means.

An additional mass of fuel to be metered-in on a one-time basis is determined if the measurement signal of a post-cat oxygen sensor disposed downstream of a three-way catalytic converter in an exhaust tract of the internal combustion engine is characteristic of at least one predefined residual oxygen component. The additional mass of fuel is in this case determined as a function of the response of the measurement signal of the post-cat oxygen sensor. A corrected mass of fuel to be supplied is determined as a function of the mass of fuel to be supplied and if necessary the mass of fuel to be metered-in on a one-time basis. An actuating signal for controlling the injection valve is generated as a function of the corrected mass of fuel to be supplied. The one-time mass of fuel to be metered-in can either be metered-in within one operating cycle of a cylinder or else spread over several operating cycles of the cylinder. The invention uses the knowledge that when the measurement signal of the post-cat oxygen sensor is characteristic of at least one predefined residual oxygen component, the three-way catalytic converter essentially cannot store any more additional oxygen and thus during operation of the internal combustion engine in this state, even if a known trim control may be present, a so-called breakthrough of the measurement signal of the post-cat oxygen sensor frequently occurs again and again with associated pollutant emissions, in particular NOX emissions of the internal combustion engine.

By the metering-in of the mass of fuel to be metered-in on a one-time basis, the three-way catalytic converter is placed in a state in which an appropriately predefinable reserve is provided for absorbing or storing oxygen, thereby enabling corresponding fluctuations in the air/fuel ratio in cylinders to be very well compensated by the three-way catalytic converter and quickly ensuring a significant reduction in pollutant emissions.

The mass of fuel to be metered-in on a one-time basis is determined as a function of a gradient of the measurement signal of the post-cat oxygen sensor. The gradient is a very good indicator of the state of the three-way catalytic converter and therefore as to whether a slight or severe oxygen overflow is present. In this way, the stored oxygen remaining in the three-way catalytic converter after metering-in of the mass of fuel to be metered-in on a one-time basis can be very precisely adjusted.

Alternatively or in addition, the mass of fuel to be metered-in on a one-time basis can be determined as a function of a minimum measured value of the measurement signal, while the measurement signal of the post-cat oxygen sensor is characteristic of at least one predefined residual oxygen component. The minimum measured value is a very good indicator of the state of the three-way catalytic converter and therefore as to whether a slight or severe oxygen overflow is present. In this way, the stored oxygen remaining in the three-way catalytic converter after metering-in of the mass of fuel to be metered-in on a one-time basis can be very precisely adjusted.

In this connection the mass of fuel to be metered-in on a one-time basis can be determined in a particularly simple manner if the measurement signal of the post-cat oxygen sensor falls below a specified first threshold value, the specified first threshold value being suitably predefined.

According to an advantageous embodiment of the invention, the mass of fuel to be metered-in on a one-time basis is predefined such that approximately 50% of the oxygen storable in the three-way catalytic converter remains after metering-in of the mass of fuel to be metered-in on a one-time basis. In this way, after metering-in of the mass of fuel to be metered-in on a one-time basis, a maximum variability of the air/fuel ratio in the relevant cylinder is possible without any increase in pollutant emissions downstream of the three-way catalytic converter.

According to another advantageous embodiment of the invention, the mass of fuel to be metered-in on a one-time basis is determined as a function of a minimum measured value of the measurement signal, while the measurement signal of the post-cat oxygen sensor is characteristic of at least one predefined residual oxygen component. The minimum measured value is a very good indicator of the state of a three-way catalytic converter and therefore as to whether a slight or severe oxygen overflow is present. In this way, the stored oxygen remaining in the three-way catalytic converter after metering-in of the mass of fuel to be metered-in on a one-time basis can be very precisely adjusted.

According to a second aspect, the invention is characterized by a method and a corresponding apparatus wherein a mass of fuel to be supplied to the cylinder is determined as a function of a load variable, and a mass of fuel reduced on a one-time basis is determined if the measurement signal of the post-cat oxygen sensor is characteristic of at least one predefined residual fuel component, namely as a function of the response of the measurement signal.

A corrected mass of fuel to be supplied is determined as a function of the mass of fuel to be supplied minus if necessary the mass of fuel reduced on a one-time basis. An actuating signal for controlling the injection valve is generated as a function of the corrected mass of fuel to be supplied, using the knowledge that, when the measurement signal of the post-cat oxygen sensor is characteristic of at least one predefined residual fuel component, the three-way catalytic converter has essentially stored no more oxygen and thus during operation of the internal combustion engine in this state, even if a known trim control may be present, a so-called breakthrough of the measurement signal of the post-cat oxygen sensor frequently occurs again and again with associated pollutant emissions, in particular CO and HC emissions of the internal combustion engine.

By means of the mass of fuel reduced on a one-time basis, with suitable selection of same a corresponding oxygen excess, relative to the stoichiometric air/fuel ratio, can be produced which then results in a corresponding storage of oxygen in the three-way catalytic converter. There is then provided in the three-way catalytic converter a correspondingly predefinable reserve for absorbing or storing oxygen. This enables corresponding fluctuations of the air/fuel ratio in cylinders to be very well compensated by the three-way catalytic converter and a substantial reduction in pollutant emissions is quickly ensured.

The mass of fuel reduced on a one-time basis is determined as a function of the gradient of the measurement signal of the post-cat oxygen sensor.

Alternatively or in addition, the mass of fuel reduced on a one-time basis can be determined as a function of a maximum value of the measurement signal, while the measurement signal of the post-cat oxygen sensor is characteristic of at least one predefined residual oxygen component.

In an advantageous embodiment of the second aspect of the invention, the mass of fuel reduced on a one-time basis is determined if the measurement signal of the post-cat oxygen sensor exceeds a predefined second threshold value. This is particularly simple.

According to a further advantageous embodiment of this aspect of the invention, the mass of fuel reduced on a one-time basis is predefined such that approximately 50% of the oxygen storable in the three-way catalytic converter is stored after a mass of fuel, less the reduced mass of fuel, has been correspondingly metered-in.

According to another advantageous embodiment of the second aspect of the invention, the estimated value of the current oxygen storage capacity of the three-way catalytic converter is determined.

BRIEF DESCRIPTION OF THE DRAWINGS

Exemplary embodiments of the invention are explained in greater detail below with reference to the accompanying schematic drawings, in which.

In the figures, constructionally or functionally identical elements are denoted by the same reference numerals throughout.

DETAILED DESCRIPTION OF THE INVENTION

Figure 1:
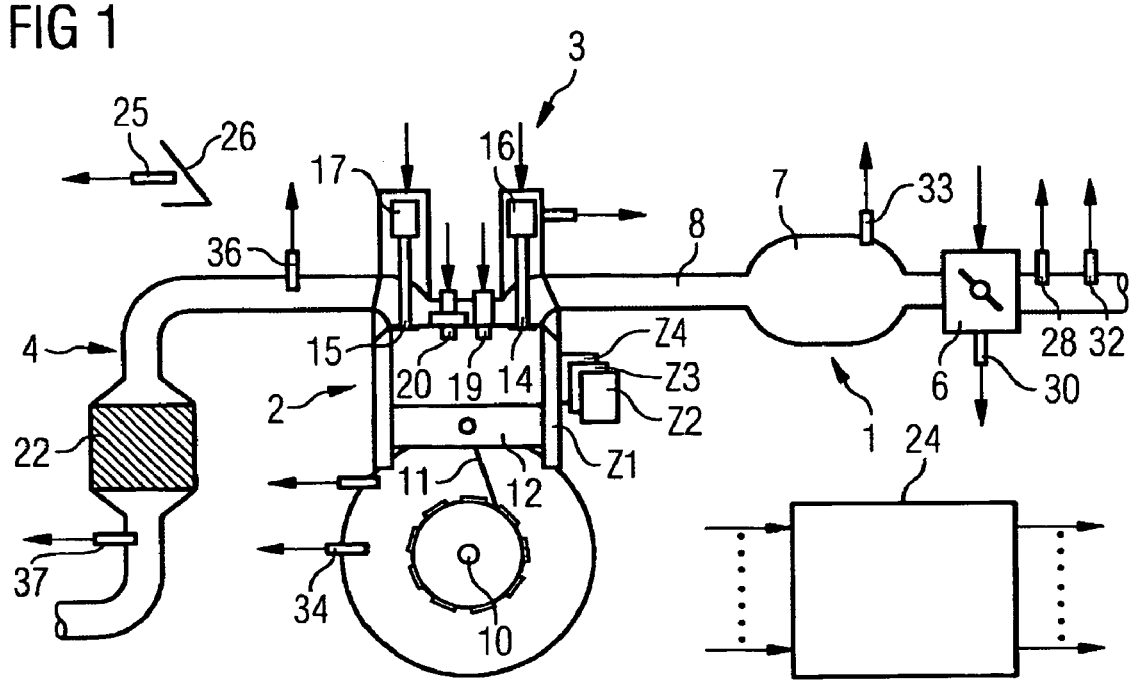
FIG. 1 shows an internal combustion engine with a control device.

An internal combustion engine (FIG. 1) comprises an intake tract 1, an engine block 2, a cylinder head 3 and an exhaust tract 4. The intake tract 4 preferably incorporates a throttle valve 6, as well as a plenum 7 and an intake pipe 8 which leads to a cylinder Z1 via an intake duct in the engine block 2. The engine block 2 additionally comprises a crankshaft 10 which is coupled to the piston 12 of the cylinder Z1 via a connecting rod 11.

The cylinder head 3 contains a valve train comprising a gas inlet valve 14, a gas outlet valve 15 and valve operating mechanisms 16, 17. The cylinder head 3 additionally incorporates an injection valve 19 and a spark plug 20. Alternatively, the injection valve 19 can also be disposed in the intake pipe 8.

The exhaust tract 4 incorporates a catalytic converter 22 which is implemented as a three-way catalytic converter.

A control device 24 is provided to which sensors are assigned which detect different measured variables and determine the measured value of the measured variable in each case. As a function of at least one of the measured variables, the control device 24 determines manipulated variables which are then converted into one or more actuating signals for controlling the actuators by means of corresponding servo drives.

The sensors are a pedal position transducer 25 which detects a position of the accelerator pedal 26, a mass air flow meter 28 which detects a mass air flow upstream of the throttle valve 6, a temperature sensor 32 which measures the intake air temperature, a crankshaft angle sensor 34 which detects a crankshaft angle to which a speed N is assigned, a post-cat oxygen sensor 37 which is disposed downstream of the three-way catalytic converter 22 and which detects a residual oxygen component of the exhaust gas downstream of the three-way catalytic converter 22. Depending on the residual oxygen content, a measurement signal MS which is preferably a voltage signal is fed out to the control device. There is additionally provided a pre-cat oxygen sensor 36 whose measurement signal is characteristic of an air/fuel ratio in the cylinder Z1. A subset of the abovementioned sensors can be present or additional sensors can also be present depending on the embodiment of the invention.

The actuators are e.g. the throttle valve 6, the gas inlet and gas outlet valves 14, 15, the injection valve 19 or the spark plug 20.

In addition to the cylinder Z1, other cylinders Z2 to Z4 are also provided to which corresponding actuators are also then assigned.

Figure 2:
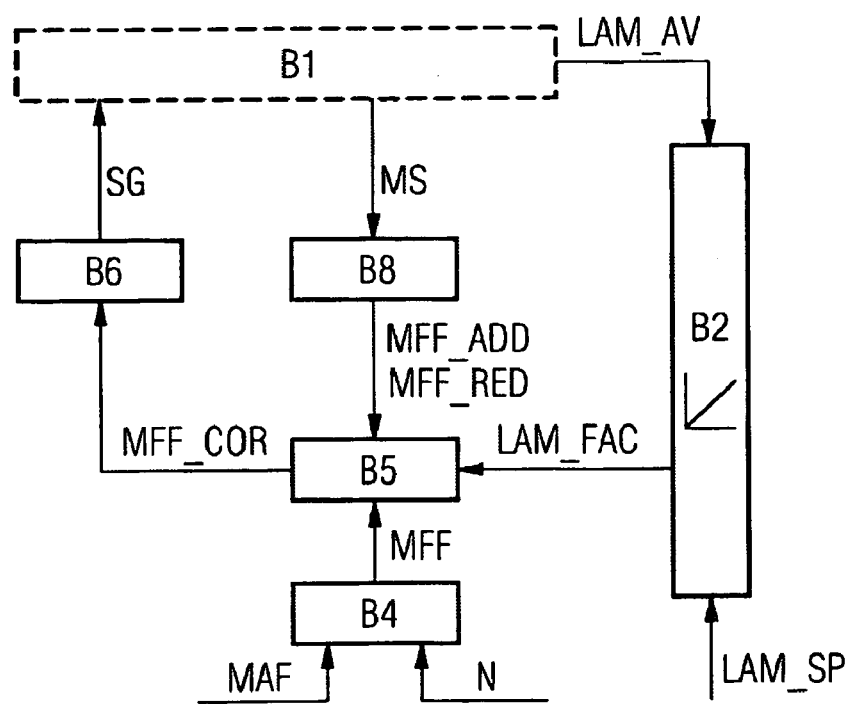
FIG. 2 shows a block diagram of the control device.

A block diagram of the control device 24, which may also be termed an apparatus for controlling the internal combustion engine, is shown in FIG. 2. The relevant blocks of the control device 24 in the context of the invention are illustrated in the block diagram.

A dashed-line block B1 corresponds to the internal combustion engine according to FIG. 1. From the measurement signal of the pre-cat oxygen sensor 36 an actual air/fuel ratio LAM_AV in the cylinder Z1-Z4 is obtained and fed to a block B2. The pre-cat oxygen sensor 36 is preferably implemented as a linear lambda probe but can also be implemented as a simple binary lambda probe whose measurement signal has a lean value if the air-fuel ratio in the cylinder Z1-Z4 is greater than a stoichiometric air/fuel ratio and whose measurement signal has a rich value if the air/fuel ratio in the cylinder Z1-Z4 is less than the stoichiometric air/fuel ratio. To the block B2 there is additionally fed a setpoint air/fuel ratio LAM_SP which is to be set in the cylinder Z1-Z4. The setpoint air/fuel ratio LAM_SP preferably has approximately the value of the stoichiometric air/fuel ratio. However, particularly in the case of a linear lambda probe, it can also be provided with forced excitation and thus vary cyclically about the stoichiometric value.

The difference between the setpoint and actual air/fuel ratio LAM_SP, LAM_AV is fed to a closed-loop controller which is implemented in the block B2. The controller has an integral control parameter and a proportional control parameter and is implemented as a lambda controller known to the average person skilled in the art. The manipulated variable of the controller in the block B2 is a lambda control factor LAM_FAC.

In a block B4, a mass of fuel to be metered-in MFF is determined as a function of a load variable, preferably a mass of air MAF in the relevant cylinder Z1-Z4 of the internal combustion engine and a speed N of the crankshaft. The mass of air MAF in the relevant cylinder Z1-Z4 is preferably determined by means of a physical model as a function of the throttle valve position determined by the throttle valve position sensor 30, the speed N and possibly other variables such as the intake pipe pressure or the detected mass air flow upstream of the throttle valve.

Alternatively, however, the load variable can also be another variable such as a torque to be produced by the internal combustion engine which is preferably determined as a function of the accelerator pedal position and possibly other variables.

Figure 3:
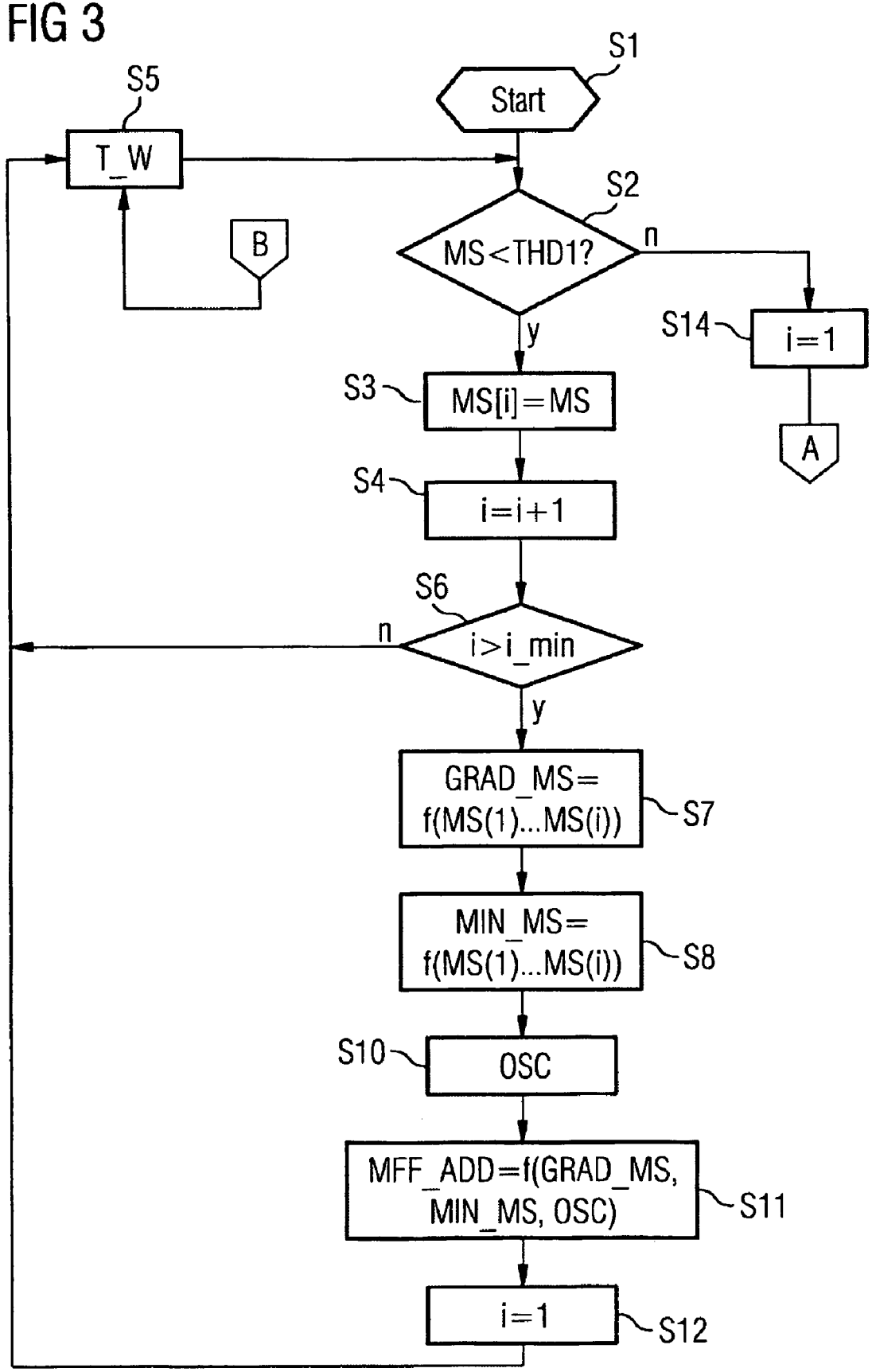
FIG. 3 shows a flowchart of a first part of a program for controlling an internal combustion engine.
Figure 4:
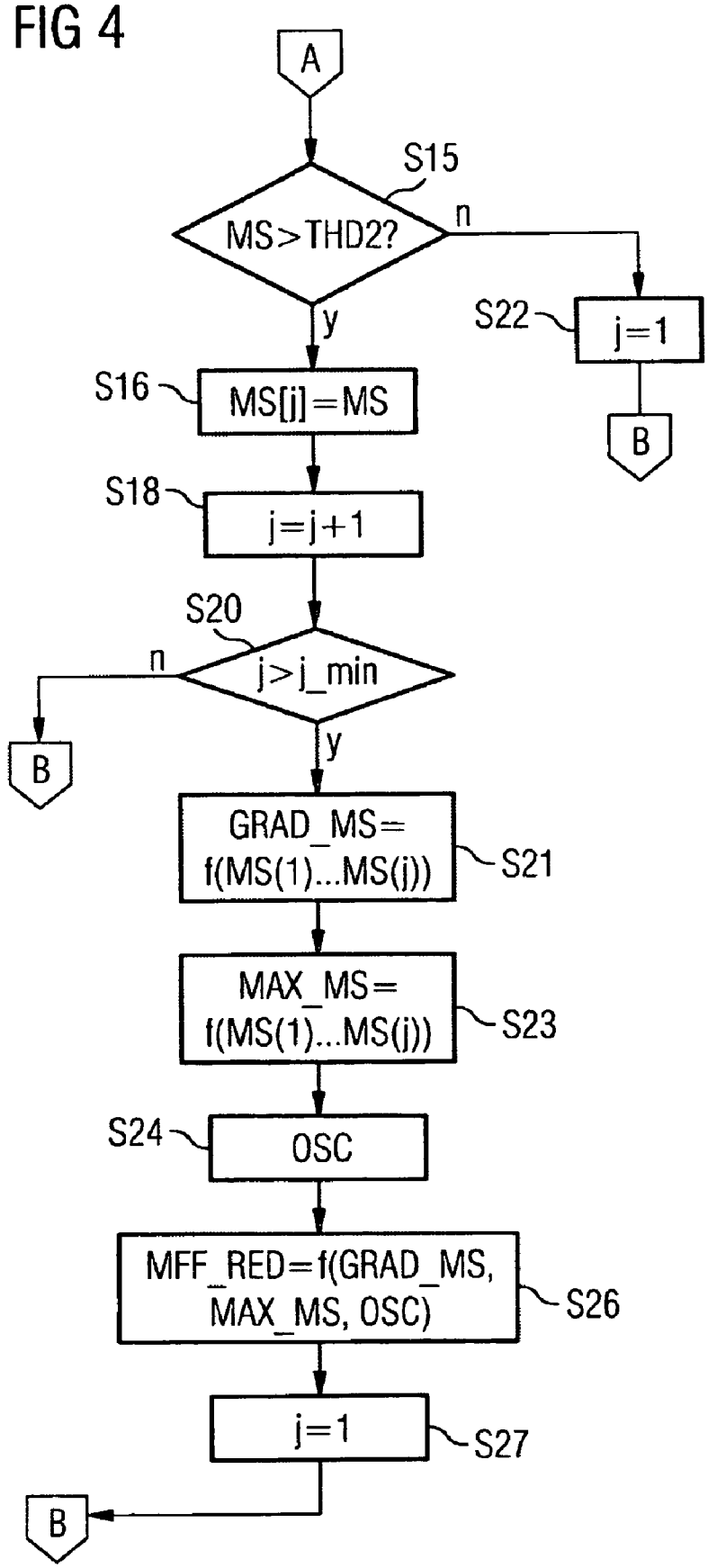
FIG. 4 shows a second part of a program for controlling the internal combustion engine.

There is additionally provided a block B8 to which the measurement signal MS of the post-cat oxygen sensor 37 is fed. In the block B8 there is determined if necessary, as a function of the measurement signal MS of the post-cat oxygen sensor 37, a mass of fuel to be metered-in on a one-time basis MFF_ADD or a mass of fuel reduced on a one-time basis MFF_RED. For this purpose there is executed in the block B8 a program which will be explained in greater detail below with reference to FIGS. 3 and 4.

A corrected mass of fuel to be metered-in MFF_COR is determined in a block B5 by means of a corrected mass of fuel to be supplied MFF_COR by multiplying the lambda control factor LAM_FAC by the sum of or difference between the mass of fuel to be metered-in and the mass of fuel to be metered-in on a one-time basis or rather the mass of fuel reduced on a one-time basis MFF_RED. Alternatively, in the block B5, the product of the mass of fuel to be metered-in MFF and the lambda control factor LAM_FAC can also be added to the mass of fuel to be metered-in on a one-time basis or rather the mass of fuel reduced on a one-time basis MFF_RED.

In a block B6, depending on the corrected mass of fuel to be metered-in MFF_COR, an actuating signal SG for the injection valve(s) 19 is generated and the injection valves 19 are actuated accordingly.

The program executed in the block B8 is initiated in a step S1, preferably contemporaneously with startup of the internal combustion engine. In step S1, variables are preferably initialized, such as a counter i or an additional counter j. The counters i, j preferably assume the value 1.

In a step S2 it is checked whether the current value of the measurement signal MS is less than a predefined first threshold value THD1. The first threshold value THD1 is suitably selected such that it is characteristic of at least one predefined residual oxygen component of the exhaust gas in the region of the post-cat oxygen sensor 37. A binary lambda probe whose measurement signal is preferably a voltage signal is preferably used as post-cat oxygen sensor. The first threshold value is then e.g. approximately 550 mV.

If the condition of step S2 is fulfilled, the current value of the measurement signal MS of the post-cat oxygen sensor 37 is temporarily stored at a memory location for the measurement signal MS which is determined by the value of the counter i. Then in a step S4 the counter i is incremented, preferably by 1.

In a step S6 it is checked whether the counter i has a value greater than a minimum counter value i_min of the counter i. The minimum counter value i_min can be e.g. two. If the condition of step S6 is not fulfilled, the program remains in a step S5 for a predefined wait time T_W before the condition of step S2 is rechecked.

If the condition of step S6 is fulfilled, in a step S7 a gradient GRAD_MS of the measurement signal MS of the post-cat oxygen sensor 37 is determined as a function of the temporarily stored values of the measurement signal MS. In this context the gradient GRAD_MS is taken to mean the variation over time, i.e. the time derivative of the measurement signal MS. The gradient GRAD_MS can be determined in different ways, for example the gradient may denote the fall over time of the measurement signal MS immediately after the first threshold value THD1 has been undershot and therefore be characteristic of the rate at which the measurement signal MS is decreasing. However, it can also be determined as being characteristic of the rate of increase of the value of the measurement signal up to the first threshold value THD1.

In a following step S8 a minimum value MIN_MS of the measurement signal MS of the post-cat oxygen sensor 37 is determined as a function of the temporarily stored values of the measurement signal MS of the post-cat oxygen sensor 37.

Then, in a step S10, an estimated value OSC of the current oxygen storage capacity of the three-way catalytic converter 22 is determined. Alternatively, the estimated value OSC of the current oxygen storage capacity of the three-way catalytic converter 22 can also be determined by another program which is executed in the control device 24, possibly at other times, and merely read in in step S10. The estimated value OSC of the current oxygen storage capacity of the three-way catalytic converter 22 is preferably determined by means of a physical model. If necessary forced excitation with an increased amplitude takes place for this purpose, particularly in the case of a linear lambda probe as pre-cat oxygen sensor, in order thus to check and determine the oxygen storage capacity of the three-way catalytic converter 22.

In a subsequent step S11, the mass of fuel to be metered-in on a one-time basis MFF_ADD is determined as a function of the gradient GRAD_MS of the measurement signal MS of the post-cat oxygen sensor 37 and/or the minimum value MIN_MS of the measurement signal MS of the post-cat oxygen sensor 37 and/or the estimated value OSC of the current oxygen storage capacity of the three-way catalytic converter 22. Preferably this takes place optionally by means of one or more engine maps determined in advance by experiments or even simulations.

Preferably the mass of fuel to be additionally metered-in MFF_ADD is thus determined in such a way that, after the metering-in of the mass of fuel to be metered-in on a one-time basis MFF_ADD, the oxygen stored in the three-way catalytic converter 22 is approximately 50% of the maximum amount of oxygen currently storable in the three-way catalytic converter 22. In a particularly simple implementation of the program, the mass of fuel to be metered-in on a one-time basis MFF_ADD can also be permanently predefined.

In a subsequent step S12, the counter i is re-initialized with the value 1 and processing is then continued in step S5.

If the condition of step S2 is not fulfilled, i.e. the current value of the measurement signal MS is not less than the first predefined threshold value THD1, the counter i is re-initialized with the value 1 in a step S14.

Following step S14, processing is continued in a step S15 in which it is checked whether the current measurement signal MS is greater than a predefined second threshold value THD2. The second threshold value THD2 is suitably predefined in such a way that if the measurement signal MS of the post-cat oxygen sensor 37 exceeds the second threshold value THD2, the measurement signal MS is characteristic of at least one predefined residual fuel component of the exhaust gas downstream of the three-way catalytic converter 22.

If the condition of step S15 is not fulfilled, the counter j is initialized in a step S22, preferably with one. Processing is then continued in the step S5.

If the condition of step S15 is fulfilled, in a step S16 the current value of the measurement signal MS of the post-cat oxygen sensor 37 is temporarily stored in a memory location for the measurement signal MS which is determined by the counter j. In a step S18 the counter j is then incremented by the value, preferably by the value 1.

In a step S20 it is checked whether the counter j is over a minimum count j_min for the counter j, which is e.g. two. If this is not the case, processing is continued in step S5.

However, if the condition of step S20 is fulfilled, in a step S21 the gradient GRAD_MS of the measurement signal MS is determined according to step S7. It may be particularly advantageous here to determine the rate of increase of the measurement signal MS after the second threshold value THD2 has been exceeded.

Then, in a step S23, the maximum value MAX_MS of the measurement signal MS of the post-cat oxygen sensor 37 is determined according to the procedure of step S8.

In a step S24 an estimated value OSC of the current oxygen storage capacity of the three-way catalytic converter 22 is then determined according to step S10, after which in a step S26 a mass of fuel reduced on a one-time basis MFF_RED is determined as a function of the gradient GRAD_MS of the measurement signal MS of the post-cat oxygen sensor 37 and/or the maximum value MAX_MS of the measurement signal MS and/or the estimated value OSC of the current oxygen storage capacity of the three-way catalytic converter 22. This takes place analogously to step S11, preferably by means of one or more engine maps and preferably in such a way that, through the one-time reduction of the mass of fuel to be metered-in, after the one-time reduction of the mass of fuel to be metered-in has taken place, the three-way catalytic converter contains approximately 50% of the maximum amount of oxygen that can be stored there. Alternatively, in step S26, the mass of fuel reduced on a one-time basis MFF_RED can be permanently predefined.

In a step S27 the counter j is re-initialized with the value 1. Processing is then continued in step S5.

The mass of fuel to be metered-in on a one-time basis MFF_ADD can be metered in either during one operating cycle of the relevant cylinder Z1-Z4 in addition to the mass of fuel MFF or also distributed over several operating cycles of the cylinder Z1-Z4. Alternatively, moreover, in block B5 the mass of fuel to be metered-in MFF can also merely be multiplied by the lambda control factor LAM_FAC and then, if necessary, the mass of fuel to be metered-in on a one-time basis MFF can be added to this product or the mass of fuel to be reduced on a one-time basis MFF_RED can be subtracted. The mass of fuel reduced on a one-time basis MFF_RED can also be set within one operating cycle of the relevant cylinder Z1-Z4 or over several operating cycles. In addition, and this also applies to the mass of fuel to be metered-in on a one-time basis MFF_ADD, it can also be metered in or reduced in a distributed manner over a plurality of injection valves assigned to different cylinders Z1-Z4.

The invention claimed is:

1. A method for controlling an internal combustion engine having an intake tract, an exhaust tract incorporating a three-way catalytic converter, and a cylinder connected to the intake tract via a gas inlet valve and connected to the exhaust tract via a gas outlet valve, an injection valve that meters-in fuel to the cylinder, and a post-cat oxygen sensor disposed in the exhaust tract downstream of the three-way catalytic converter, comprising:
    determining a mass of fuel supplied to the cylinder as a function of a load variable;
    measuring a post-catalytic converter exhaust gas by the post-cat oxygen sensor;
    generating a post-cat oxygen sensor measurement signal;
    comparing the post-cat oxygen sensor measurement signal with a characteristic post-cat oxygen sensor measurement signal representing a predefined residual oxygen component;
    determining if the generated post-cat oxygen sensor measurement signal is representative of the characteristic post-cat oxygen sensor measurement signal based on the comparison;
    if the generated post-cat oxygen sensor measurement signal is determined to be representative of the characteristic post-cat oxygen sensor measurement signal:
        calculating a gradient of the post-cat oxygen sensor measurement signal based on at least two values of the post-cat oxygen sensor measurement signal; and
        determining an individual mass of fuel metered-in to the cylinder as a function of the calculated gradient of the at least two values of the post-cat oxygen sensor measurement signal;
    determining a corrected mass of fuel supplied as a function of:
        the mass of fuel supplied, and
        the individual mass of fuel metered-in if the generated post-cat oxygen sensor measurement signal is determined to be representative of the characteristic post-cat oxygen sensor measurement signal: and
    generating an actuating signal that controls the injection valve as a function of the corrected mass of fuel supplied.

2. The method as claimed in claim 1, wherein the individual mass of fuel metered-in to the cylinder is determined if the post-cat oxygen sensor measurement signal is below a predefined first threshold.

3. The method as claimed in claim 1, wherein the individual mass of fuel metered-in to the cylinder is predefined such that approximately 50% of the oxygen storable in the three-way catalytic converter remains on the three-way catalytic converter.

4. The method as claimed in claim 1, the individual mass of fuel metered-in to the cylinder is determined as a function of an estimated value of the current oxygen storage capacity of the three-way catalytic converter.

5. The method as claimed in claim 1, herein the internal combustion engine comprises a plurality of cylinders.

6. The method as claimed in claim 1, wherein the corrected mass of fuel supplied is determined as a function of the mass of fuel supplied and the individual mass of fuel metered-in.

7. A method for controlling an internal combustion engine having an intake tract, an exhaust tract incorporating a three-way catalytic converter, and at least one cylinder connected to the intake tract via a gas inlet valve and connected to the exhaust tract via a gas outlet valve, an injection valve that meters-in fuel to the relevant cylinder, and a post-cat oxygen sensor disposed in the exhaust tract downstream of the three-way catalytic converter, comprising:
    determining a mass of fuel supplied to the relevant cylinder as a function of a load variable;
    determining if a measurement signal of the post-cat oxygen sensor is characteristic of a post-cat oxygen sensor measurement signal response;
    if the post-cat oxygen sensor measurement signal is determined to be characteristic of a predefined residual fuel component:
        calculating a gradient of the post-cat oxygen sensor measurement signal based on at least two values of the post-cat oxygen sensor measurement signal; and
        determining an individual mass of fuel reduced as a function of the calculated gradient of the at least two values of the post-cat oxygen sensor measurement signal if the post-cat oxygen sensor measurement signal is determined to be characteristic of a predefined residual fuel component;
    determining a corrected mass of fuel supplied as a function of the mass of fuel supplied and, if the post-cat oxygen sensor measurement signal is determined to be characteristic of a predefined post-cat oxygen sensor measurement signal response, the individual mass of fuel to be reduced; and
    generating an actuation signal that controls the injection valve as a function of the corrected mass of fuel supplied.

8. The method as claimed in claim 7, wherein the individual mass of fuel reduced is determined if the post-cat oxygen sensor measurement signal exceeds a predefined second threshold value.

9. The method as claimed in claim 7, wherein the individual mass of fuel reduced is predefined such that approximately 50% of the oxygen storable in the three-way catalytic converter is stored after the reduced mass of fuel has been metered-in to the cylinder.

10. The method as claimed in claim 7, wherein the individual mass of fuel reduced is determined as a function of an estimated value of the current oxygen storage capacity of the three-way catalytic converter.

11. A system for controlling an internal combustion engine having an intake tract, an exhaust tract incorporating a three-way catalytic converter, and at least one cylinder connected to the intake tract via a gas inlet valve and connected to the exhaust tract via a gas outlet valve, an injection valve that meters-in fuel to an associated cylinder, comprising:
    a post-cat oxygen sensor arranged in the exhaust tract downstream of the three-way catalytic converter that generates a post-cat oxygen sensor signal representative of a residual oxygen component of a post-cat exhaust gas of the engine; and
    a controller that:
        determines a mass of fuel to be supplied to the associated cylinder as a function of a load variable, measures a post-catalytic converter exhaust gas by the post-cat oxygen sensor, generates a post-cat oxygen sensor measurement signal, compares the post-cat oxygen sensor measurement signal with a characteristic post-cat oxygen sensor measurement signal representing a predefined residual oxygen component, determines if the generated post-cat oxygen sensor measurement signal is representative of the characteristic post-cat oxygen sensor measurement signal based on the comparison, if the generated post-cat oxygen sensor measurement signal is determined to be representative of the characteristic post-cat oxygen sensor measurement signal:

calculates a gradient of the post-cat oxygen sensor measurement signal based on at least two values of the post-cat oxygen sensor measurement signal; and determines an individual mass of fuel metered-in to the cylinder as a function of the calculated gradient of the at least two values of the post-cat oxygen sensor measurement signal, determines a corrected mass of fuel supplied as a function of:

the mass of fuel supplied, and the individual mass of fuel metered-in if the generated post-cat oxygen sensor measurement signal is determined to be representative of the characteristic post-cat oxygen sensor measurement signal, and generates an actuating signal that controls the injection valve as a function of the corrected mass of fuel supplied.

12. The system as claimed in claim 11, wherein the corrected mass of fuel supplied is determined as a function of the mass of fuel supplied and the individual mass of fuel metered-in.

\* \* \* \* \*